United States Patent
Yamayoshi et al.

(10) Patent No.: US 9,323,067 B2
(45) Date of Patent: Apr. 26, 2016

(54) DISPLAY APPARATUS AND METHOD OF MANUFACTURING THE SAME

(71) Applicant: MITSUBISHI ELECTRIC CORPORATION, Tokyo (JP)

(72) Inventors: Kazushi Yamayoshi, Kumamoto (JP); Junichi Tsuchimichi, Kumamoto (JP); Hiromasa Morita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 178 days.

(21) Appl. No.: 13/900,461

(22) Filed: May 22, 2013

(65) Prior Publication Data

US 2013/0321911 A1    Dec. 5, 2013

(30) Foreign Application Priority Data

Jun. 5, 2012  (JP) ................................ 2012-128168

(51) Int. Cl.
| | |
|---|---|
| G02B 27/22 | (2006.01) |
| H01J 9/20 | (2006.01) |
| G02F 1/1333 | (2006.01) |
| G02F 1/1335 | (2006.01) |

(52) U.S. Cl.
CPC ...... *G02B 27/2214* (2013.01); *G02F 1/133351* (2013.01); *G02F 1/133512* (2013.01); *H01J 9/205* (2013.01)

(58) Field of Classification Search
CPC .... G02B 27/2214; G02B 27/26; G02B 27/22; G02B 27/225; H04N 13/0409; H04N 13/0225; H04N 13/0411; H04N 13/0415; G02F 1/133351; G02F 1/133512

USPC ............ 359/462, 464, 465; 349/187, 62, 106; 445/25

See application file for complete search history.

(56) References Cited

U.S. PATENT DOCUMENTS

| | | | |
|---|---|---|---|
| 6,142,004 A | 11/2000 | Wier | |
| 2005/0243253 A1* | 11/2005 | Imai et al. | ..................... 349/122 |
| 2009/0086150 A1* | 4/2009 | Koyama et al. | ............... 349/153 |

(Continued)

FOREIGN PATENT DOCUMENTS

| | | | |
|---|---|---|---|
| JP | 11-095167 A | 4/1999 | |
| JP | 11-219949 A | 8/1999 | |

(Continued)

OTHER PUBLICATIONS

T. Tomoo; "About Dual View Liquid Crystal and Triple View Liquid Crystal"; Sharp Technical Journal 96, pp. 21-12, Nov. 2007.

*Primary Examiner* — Bumsuk Won
*Assistant Examiner* — Ephrem Mebrahtu
(74) *Attorney, Agent, or Firm* — Studebaker & Brackett PC (57) ABSTRACT

A method of manufacturing a display apparatus having a display material provided between a pair of substrates arranged to face each other, the method comprises: bonding a first mother substrate and a second mother substrate to form a cell substrate from which one or more panels are bring out; thinning one of the first mother substrate and the second mother substrate after forming the cell substrate; forming a parallax barrier layer that separates a display image and a light transmission layer to be stacked on the parallax barrier layer on a surface of the one of the first mother substrate and the second mother substrate at an outer-side face of the cell substrate; and dividing the cell substrate into one or more panels.

2 Claims, 9 Drawing Sheets

(56) References Cited

U.S. PATENT DOCUMENTS

| | | | |
|---|---|---|---|
| 2011/0102732 A1* | 5/2011 | Washizawa | G02B 27/2214 349/187 |
| 2011/0149218 A1 | 6/2011 | Nakayama | |
| 2011/0187832 A1* | 8/2011 | Yoshida | 348/46 |

FOREIGN PATENT DOCUMENTS

| | | |
|---|---|---|
| JP | 2004-053706 A | 2/2004 |
| JP | 2004-184664 A | 7/2004 |
| JP | 2009-210973 A | 9/2009 |
| JP | 2011-128547 A | 6/2011 |

* cited by examiner

DISPLAY APPARATUS AND METHOD OF MANUFACTURING THE SAME

CROSS-REFERENCE TO RELATED APPLICATION

This application claims priority from Japanese Patent Application No. 2012-128168 filed on Jun. 5, 2012, the entire subject matter of which is incorporated herein by reference.

TECHNICAL FIELD

This disclosure relates to a display and a method of manufacturing the same, and specifically, to a display apparatus having a parallax barrier layer and a method of manufacturing the same.

BACKGROUND

In recent years, a Liquid Crystal Display (LCD) apparatus that displays different images depending on viewing angles has been applied as a 3D-LCD or dual-screen LCD. The 3D-LCD provides a parallax to display a stereographic image by enabling both eyes of an observer to recognize images viewed at different points of view and is also referred to as a three-dimensional liquid crystal display apparatus (for example, refer to JP-A-11-95167). In the meantime, the dual-screen LCD displays images of two types having different contents at the same time for a plurality of observers at different observation positions and is also referred to as a dual view liquid crystal (for example, refer to "About Dual View Liquid Crystal and Triple View Liquid Crystal", Tomoo TAKAYA, Sharp Technical Journal 96, pp 21-23, November 2007). A triple-screen LCD that displays images of three types having different contents at the same time for a plurality of observers at different observation positions is also referred to as a triple view liquid crystal.

In the above liquid crystal display apparatus, an image viewing angle is generally divided by a parallax barrier pattern having a stripe shape provided in a display area. Regarding a method of arranging the parallax barrier pattern, JP-A-2011-128547 (paragraphs [0062] to [0079]) discloses a method of completing an LCD panel, thinning a thickness of a color filter substrate and then forming a parallax barrier at an outer-side face of the panel.

SUMMARY

However, according to the method disclosed in JP-A-2011-128547, a polishing operation is performed so as to thin the substrate, and then the parallax barrier is formed on the polished surface. Accordingly, a pattern defect may be generated in the parallax barrier due to an unevenness or glass scratch of the polished surface, in many cases. Specifically, an exposure is performed in a patterning operation for forming the parallax barrier by a photosensitive Bk resist. However, since the exposure is out of focus by the unevenness or scratch on the substrate due to foreign materials on the polished surface, an area is generated in which a sufficient amount of light cannot be illuminated. In particular, if the Bk resist has the negative photosensitivity, the Bk resist in an area, which should not be dissolved under normal circumstances when a developing operation is performed by a photocrosslinking reaction, is dissolved.

The parallax barrier has a light blocking effect. Accordingly, the unnecessary light is leaked from a part, in which a pattern defect that the parallax barrier is not formed in a desired area is caused, so that a display defect is caused as a brightness point defect.

Also, even though there is no pattern defect upon the formation of the parallax barrier, the display defect may be caused as a brightness point defect when the pattern defect is caused due to the scratch or attachment of the foreign materials on the parallax barrier surface during a manufacturing process thereafter.

In view of the above, this disclosure provides a display apparatus capable of suppressing a brightness point defect while improving productivity thereof, and a method of manufacturing the same.

In this disclosure, a method of manufacturing a display apparatus having a display material provided between a pair of substrates arranged to face each other comprises: bonding a first mother substrate and a second mother substrate to form a cell substrate from which one or more panels are bring out; thinning one of the first mother substrate and the second mother substrate after forming the cell substrate; forming a parallax barrier layer that separates a display image and a light transmission layer to be stacked on the parallax barrier layer on a surface of the one of the first mother substrate and the second mother substrate at an outer-side face of the cell substrate; and dividing the cell substrate into one or more panels.

Further, a display apparatus of this disclosure comprises: a first substrate; a second substrate that is arranged to face the first substrate and is thinner than the first substrate; a sealant that bonds the first substrate and the second substrate; a display material that is provided between the first substrate and the second substrate; and a parallax barrier layer and a light transmission layer stacked on the parallax barrier layer that are provided on a surface of the second substrate opposite to the first substrate.

According to this disclosure, it is possible to provide a display apparatus capable of suppressing a brightness point defect while improving productivity thereof, and a method of manufacturing the same.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Illustrative Embodiment

Figure 1:
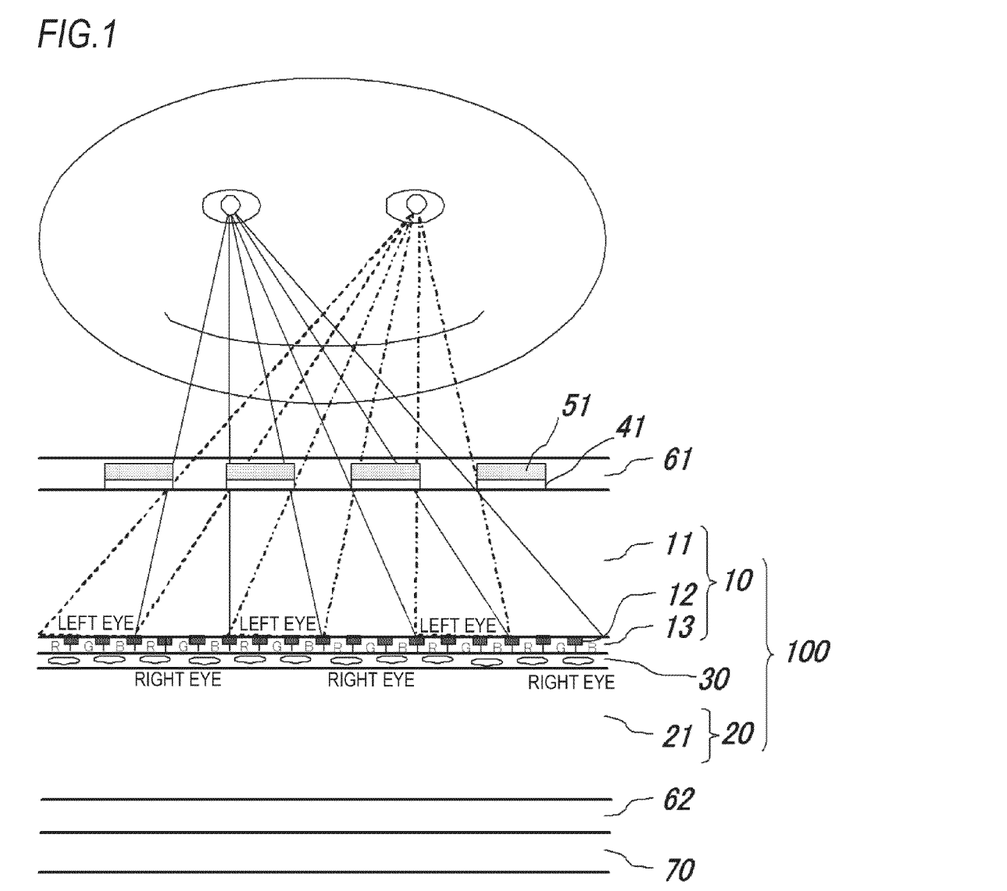
FIG. 1 is a sectional view illustrating a configuration of a liquid crystal display apparatus of a first illustrative embodiment.

First, a display apparatus of a first illustrative embodiment is described with reference to FIG. 1. FIG. 1 is a sectional view illustrating a configuration of a liquid crystal display apparatus that is an example of the display apparatus of the first illustrative embodiment. In FIG. 1, a partial section in a display area is shown. The display apparatus of the first illustrative embodiment is an active matrix-type liquid crystal display apparatus, as an example. However, a flat panel display apparatus such as organic EL display apparatus and the like may be also used.

The display apparatus of the first illustrative embodiment is a display apparatus that can display different images, respectively, when seen from at least two points of view. Herein, the point of view is each position of right and left eyes of one observer, and also, when the observers are plural, the point of view is a position of each observer. Therefore, the display apparatus of the first illustrative embodiment is implemented as a three-dimensional display apparatus that can stereoscopically display images for one observer, a dual-screen display apparatus that can respectively display different images for a plurality of observers, or the like. Hereinafter, a case where this disclosure is mainly applied to the three-dimensional display apparatus will be described.

In FIG. 1, the liquid crystal display apparatus of the first illustrative embodiment has a liquid crystal display panel 100. The liquid crystal display panel 100 has a configuration where a first substrate such as Color Filter (CF) substrate 10 and a second substrate such as Thin Film Transistor (TFT) substrate 20 are arranged to face each other. Liquid crystals 30 are enclosed in a space between sealants bonding both substrates.

The TFT substrate 20 has a substrate 21 on which a pixel electrode, gate wirings (scanning signal lines) and source wirings (image signal lines) (not shown), which form a display area thereon, are respectively formed via an insulation film. The gate wirings are provided in parallel with each other. Likewise, the source wirings are provided in parallel with each other. The gate wirings and the source wirings are formed to intersect with each other. For example, the gate wiring and the source wiring intersect with each other. An area, which is surrounded by the gate wiring and source wiring adjacent to each other, is a pixel. Accordingly, the pixels are arranged in a matrix shape in the display area. The pixel electrode is formed substantially over the entire pixels.

A TFT (not shown) that is a switching element is formed in the vicinity of an intersection point of the gate wiring and the source wiring. The TFTs are arranged in an array shape in the display area. The TFT has a drain electrode and a source electrode (not shown) that are formed at the same layer as the source wiring. The source electrode and the drain electrode are connected via a semiconductor layer. The source wiring and the pixel electrode are connected via the TFT. Therefore, when the TFT becomes ON by a scanning signal, a display signal is supplied from the source wiring to the pixel electrode.

An orientation film (not shown) for orienting the liquid crystals 30 is provided on the pixel electrode. Also, a terminal (not shown) for receiving a signal, which is supplied to the TFT, from an outside and the like are formed on the TFT substrate 20.

In the meantime, the CF substrate 10 has a black matrix (BM) 12 that is formed on a surface of a substrate 11 thereof facing the TFT substrate 20, is made of black resin or metal such as chromium oxide and blocks light. Since it can be made to be thinner, it is preferable that the BM 12 is formed of a metal material, as compared to the black resin. A color filter layer 13 made of pigment or dye is formed to fill openings provided to the BM 12. The color filter layer 13 is a coloring layer of R (red), G (green) and B (blue), for example. Further, an opposite electrode (not shown) is formed substantially over an entire surface of the CF substrate 10 so as to cover the BM 12 and the color filter layer 13. The opposite electrode generates an electric field between the opposite electrode and the pixel electrode of the TFT substrate 20, thereby driving the liquid crystals 30. An orientation film (not shown) for orienting the liquid crystals 30 is deposited on a surface of the CF substrate 10 contacting the liquid crystals 30.

The TFT substrate 20 and the CF substrate 10 are bonded to each other via the sealant. The sealant has a frame shape surrounding the display area. A liquid crystal layer is sandwiched between the TFT substrate 20 and the CF substrate 10. That is, the liquid crystals 30 are introduced between the TFT substrate 20 and the CF substrate 10.

A polarization plate 62 is bonded on an outer-side face of the substrate 21 of the TFT substrate 20. On the other hand, a laminated structure of parallax barrier layers 41 for separating images and light transmission layers 51 is formed on an outer-side face of the substrate 11 of the CF substrate 10. The parallax barrier layers 41 are formed by a light shield film made of black resin or metal such as chromium oxide. The parallax barrier layers 41 are arranged in a predetermined pattern according to the pixel arrangement so that the light having transmitted a predetermined pixel reaches a right or left eye of an observer. The arrangement of the parallax barrier layers is determined in accordance with a size of the liquid crystal display panel, an observation distance (designed value) and the like. The light transmission layers 51 are formed as an upper layer than the parallax barrier layers 41 on the CF substrate 10. The light transmission layers 51 are formed by illuminating UV light on a photosensitive resin film and performing developing and patterning processes. Also, a polarization plate 61 is bonded on an outer-side face of the substrate 11 to cover the light transmission layer 51.

In the meantime, a backlight unit 70 is provided on an opposite-visible side of the liquid crystal display panel 100.

In the liquid crystal display apparatus configured as described above, the liquid crystals 30 are driven by the electric field between the pixel electrode and the opposite electrode. That is, an orientation direction of the liquid crystals 30 between the substrates is changed. Thereby, a polarized state of the light passing through the liquid crystal layer is changed. That is, a polarized state of the light, which passes through the polarization plate and then becomes linearly polarized light, is changed by the liquid crystal layer. Specifically, the light emitted from the backlight unit 70 becomes the linearly polarized light by the polarization plate 62 at a side of the TFT substrate 20. The linearly polarized light passes through the liquid crystal layer, so that the polarized state thereof is changed.

An amount of the light passing through the polarization plate 61 at a side of the CF substrate 10 is changed by the polarized state. That is, the amount of the light, which passes through the polarization plate 61 at the visible side, of the transmission light transmitting the liquid crystal display panel 100 from the backlight unit 70 is changed. The orientation direction of the liquid crystals 30 is changed by a display voltage applied. Therefore, it is possible to change the amount of the light passing through the polarization plate 61 at the visible side by controlling the display voltage. That is, it is possible to display a desired image by changing the display voltage for each pixel.

Here, two images are alternately displayed for each pixel row via the parallax barrier layers 41, which are arranged in a ratio of one to two pixels, so that two different displays can be separately displayed in predetermined directions, respectively. Meanwhile, the example has been here exemplified in which three colors of R, G and B are combined as one pixel unit, and the parallax barrier layers 41 are arranged in the ratio of about one to two pixels. However, the parallax barrier layers 41 may be arranged in a ratio of about one to two dots, in correspondence to each dot of R, G and B.

An operating mode of the liquid crystal display apparatus may have a TN (Twisted Nematic) mode, an STN (Super Twisted Nematic) mode, a ferroelectric liquid crystal mode and the like. Also, a liquid crystal display apparatus of a horizontal electric field type such as an IPS (In-Plane Switching) mode, an FFS (Fringe Field Switching) mode and the like, in which the opposite electrode provided on the CF substrate 10 in other mode is arranged on a side of the TFT substrate 20 and thus the liquid crystals 30 between the opposite electrode and the pixel electrode are horizontally applied with an electric field, may be also used. Meanwhile, for the horizontal-electric-field-type liquid crystal panel, it is necessary to slightly change the configuration of the first illustrative embodiment in a part except for the main parts of this disclosure, such as overcoat film that is provided on the color filter layer 13 and the BM 12 of the CF substrate 10-side, instead of the opposite electrode. Also, this disclosure is not limited to the transmission type and can be applied to a reflection-type liquid crystal display apparatus and a semi-transmission liquid crystal display apparatus using both transmission and reflection.

Meanwhile, in the first illustrative embodiment, the parallax barrier layers 41 are provided between the CF substrate 10 and the polarization plate 61. However, the parallax barrier layers may be provided between the TFT substrate 20 and the polarization plate 62. Also, although the CF substrate 10 is arranged at the visible side and the TFT substrate 20 is arranged at the backlight side, they may be reversed. That is, the parallax barrier layers 41 has only to be provided on the outer-side face of any one of the first substrate and the second substrate that are arranged to face each other.

Figure 2:
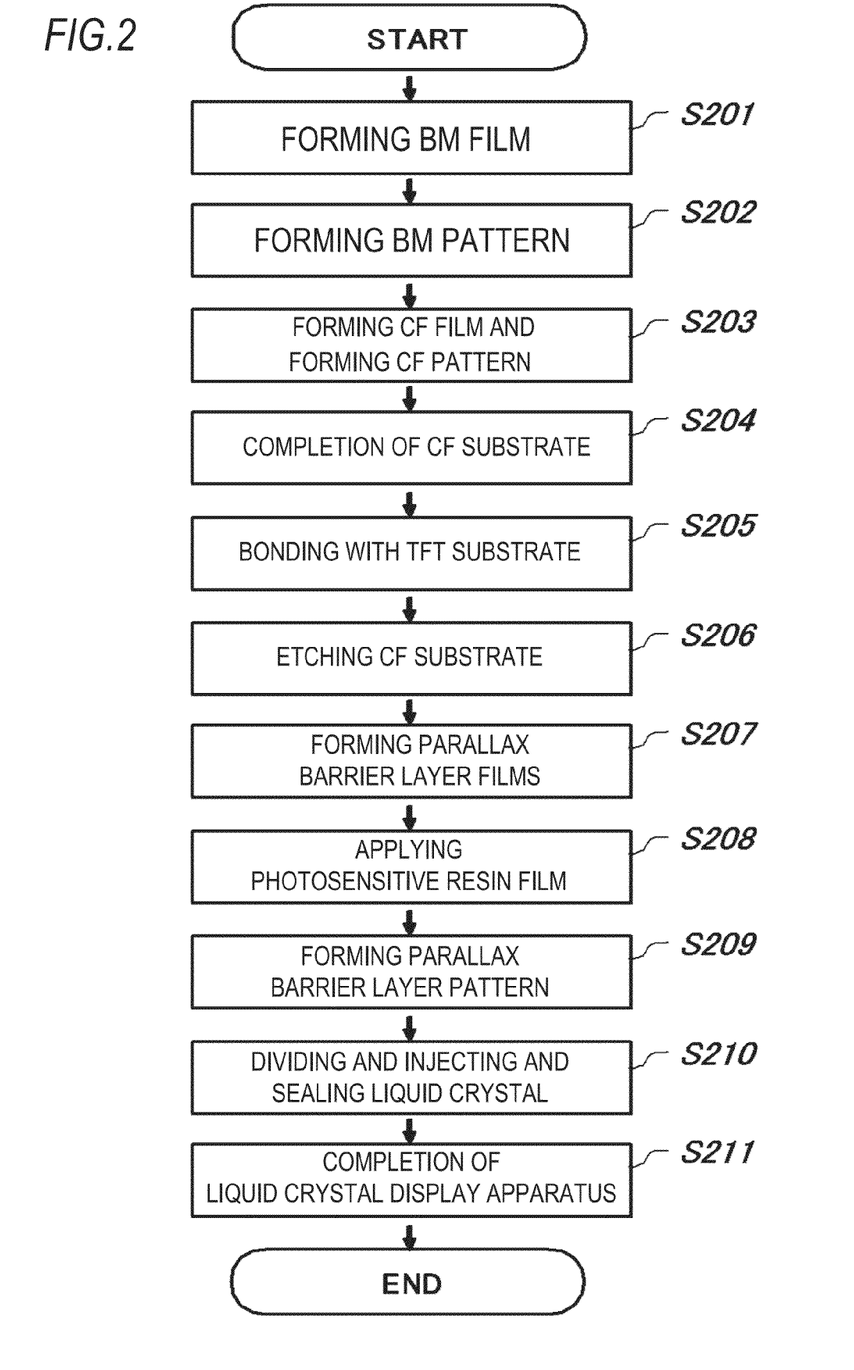
FIG. 2 is a flowchart illustrating a sequence of a manufacturing process of the liquid crystal display apparatus of the first illustrative embodiment.
Figure 3A:
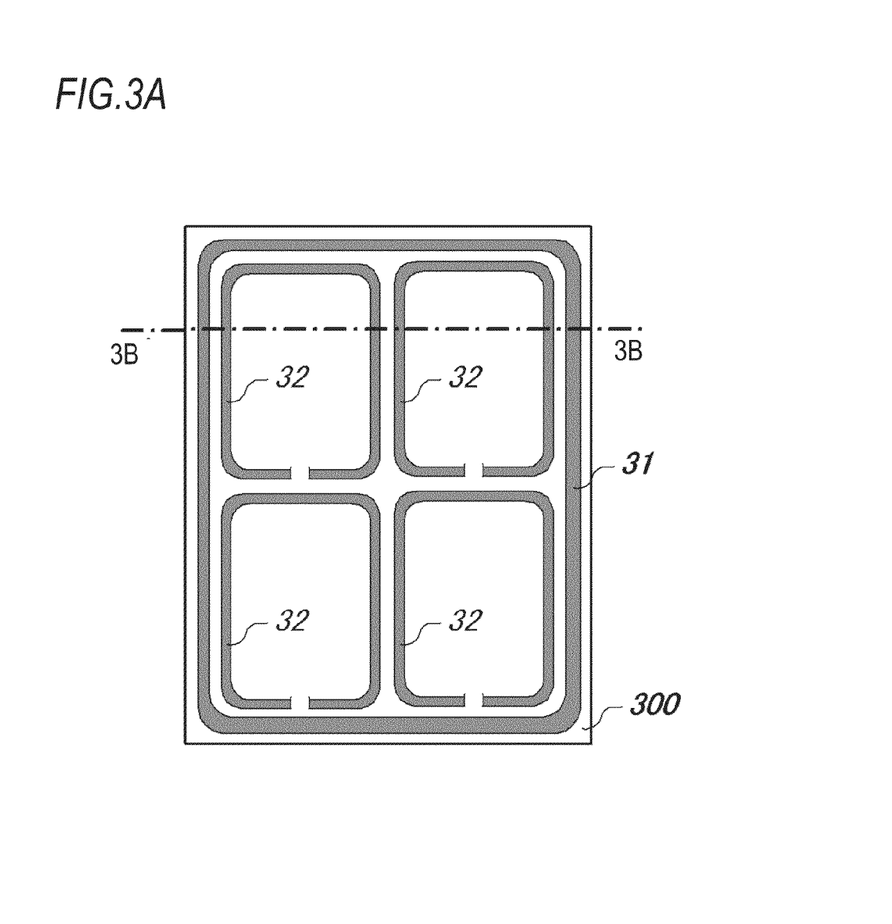
FIGS. 3A and 3B illustrate one manufacturing process of the liquid crystal display apparatus of the first illustrative embodiment.
Figure 3B:
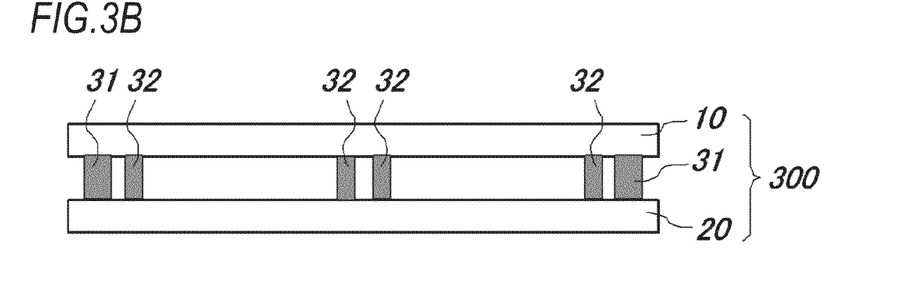
Figure 4A:
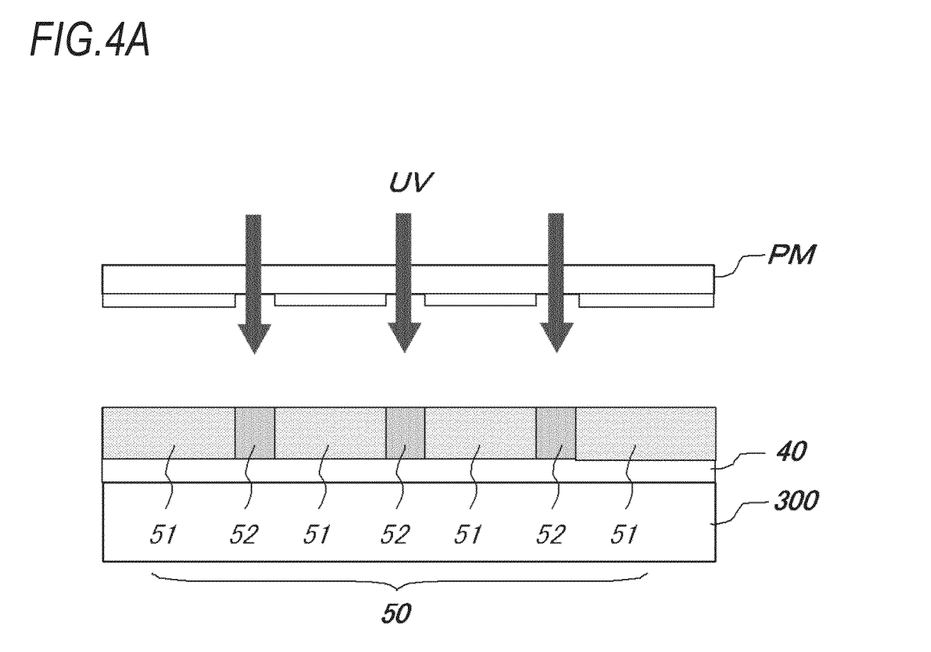
FIGS. 4A, 4B and 4C illustrate one manufacturing process of the liquid crystal display apparatus of the first illustrative embodiment.
Figure 4B:
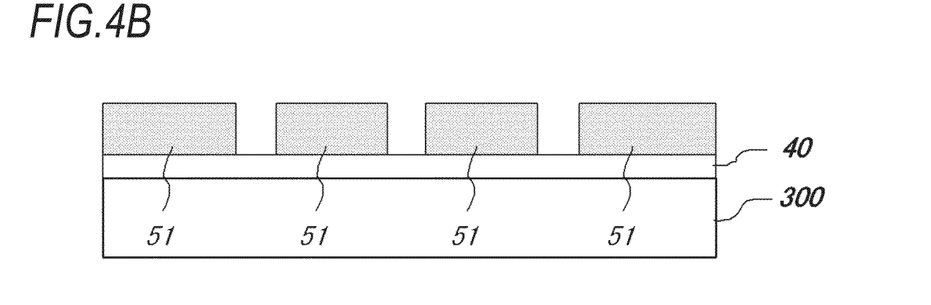
Figure 4C:
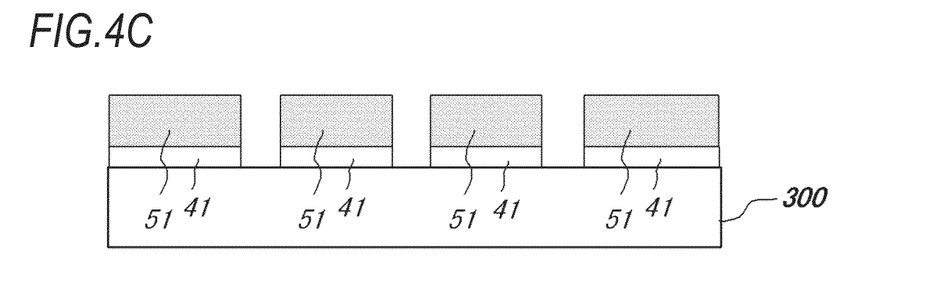

Subsequently, a method of manufacturing the liquid crystal display apparatus of the first illustrative embodiment will be described with reference to FIG. 2. FIG. 2 is a flowchart illustrating a sequence of a manufacturing process of the liquid crystal display apparatus of the first illustrative embodiment. In the below, the method will be described with reference to FIGS. 3 and 4. FIGS. 3 and 4 show one manufacturing process of the liquid crystal display apparatus of the first illustrative embodiment.

First, a light shield film for forming the BM 12 is formed on one surface of the substrate 11 (step S201). As the light shield film, a resin containing a pigment or metal such as chromium may be used. The method of forming the light shield film is not particularly limited and a well-known method may be appropriately selected depending on the material to be used. The formed light shield film is patterned to form a pattern of the BM 12 (step S202). Regarding the patterning method of the light shield film, a well-known method may be appropriately selected depending on the formed film material. Meanwhile, in step S202, an alignment mark that will be used in a subsequent positioning process is preferably formed at the same time.

Subsequently, the respective layers configuring the CF substrate 10 are formed, and then a patterning thereof is performed (step S203). Specifically, the color filter layer 13 is formed on the BM 12 by a photolithography method. The color filter layer 13 may be formed using a photosensitive resin containing pigment or dye. Then, the opposite electrode is formed over an nearly entire surface of the substrate 11 so that it covers the BM 12 and the color filter layer 13. As the opposite electrode, a transparent conductive film consisting of ITO or the like is used. Like this, the CF substrate 10 is formed by the typical manufacturing method, so that the CF substrate 10 is formed (step S204).

The orientation film is formed on the CF substrate 10 having a mother board shape manufactured as described above, and also the orientation film is formed on the TFT substrate 20 having a mother board shape separately manufactured by repeating the film formation, the patterning by the photolithography method and the pattern formation by an etching and the like on one surface of the other substrate 21. Then, orientation processing (rubbing processing) for forming a micro scratch in one direction on a contact surface with the liquid crystals is performed for the orientation films.

Then, the sealant is applied to any one of the TFT substrate 20 and the CF substrate 10. After that, both substrates are bonded to face the electrodes of the TFT substrate 20 and the CF substrate 10 with each other. Then, the sealant is cured with both substrates being adhered. Like this, the CF substrate 10 and the TFT substrate 20 having a mother board shape are bonded to each other by the typical panel process (step S205). Thereby, as shown in FIG. 3, a cell substrate 300, in which the CF substrate 10 and the TFT substrate 20 having a mother board shape are bonded to each other and thus integrated, is formed. That is, the cell substrate 300, from which a plurality of panels is bring out, is formed.

FIG. 3A is a plan view illustrating a process after forming the cell substrate 300 and FIG. 3B is a sectional view taken along a line 3B-3B of FIG. 3A. As shown in FIG. 3A, the cell substrate 300 has a configuration where the CF substrate 10 and TFT substrate 20 having a mother board shape are bonded to each other by the sealant. In the first illustrative embodiment, the sealant has a substrate seal part 31 that is formed at the periphery of the cell substrate 300 and panel seal parts 32 that are formed for respective panels at the inside of the substrate seal part 31. The panel seal part 32 has a frame shape surrounding the display area of each panel, except for a part being a liquid crystal injection port.

The substrate seal part 31 is provided so as to suppress a panel from being contaminated or corroded therein due to polishing, etching processing and the like that are performed for the cell substrate 300. That is, the substrate seal part 31 is formed at the outer-side face of the panel seal parts 32 and surrounds all the panel seal parts 32. Therefore, the cell substrate 300 is formed with a closed space that is surrounded by the CF substrate 10, the TFT substrate 20 and the substrate seal part 31. Since the panel seal parts 32, i.e., the panels having opened liquid crystal injection ports are provided in the close space, the contamination or corrosion can be suppressed.

Like this, the plurality of panels is formed in the cell substrate 300 at the same time, so that it is possible to improve the manufacturing productivity. In the meantime, the number of panels that are formed in the cell substrate 300 may be one.

After forming the cell substrate 300, a side of the CF substrate 10 to be an interval between the color filter layer 13 and the parallax barrier layer 41 for providing the parallax is chemically polished or etched, so that the substrate 11 is made to be thin (step S206). Then, a light shield film 40 for forming the parallax barrier layers 41 is formed on an outer-side face of the cell substrate 300 (step S207). Here, the light shield film 40 for forming the parallax barrier layers 41 is formed on the surface of the CF substrate 10-side, i.e., an opposite surface to the surface of the substrate 11 on which the BM 12 is formed.

The light shield film 40 may be formed of black resin or metal such as chromium oxide and the like. The metal may be preferably used, because the light shield film formed of metal is to be made thinner as compared to the black resin, is little damaged in a series of processes of forming the liquid crystal display panel, and thus the sufficient light blocking effect can be obtained with a relatively thin film. The method of forming the light shield film 40 is not particularly limited, and a well-known method may be appropriately selected depending on the material to be used.

Also, a transparent photosensitive resin film 50 for forming the light transmission layers 51 is applied on the light shield film 40 for forming the parallax barrier layers 41 (step S208). As the material of the light transmission layer 51, acryl or polyimide may be used. The photosensitivity may have positive or negative photosensitivities. However, the positive photosensitivity can avoid damage to the parallax barrier layers 41 due to the UV light. A thickness of the transparent photosensitive resin film 50 is preferably 0.5 to 3 µm. In case that the thickness is smaller than 0.5 µm, the transparent photosensitive resin film 50 may be peeled off upon developing, so that a pattern cannot be formed. When the thickness is larger than 3 µm, it is not possible to perform high-precision pattern processing.

After that, after performing heating and drying by using an oven and the like, an exposure is performed using a photomask PM. When the photosensitivity of the photosensitive resin film 50 is positive, the UV light is illuminated to an area 52 of the photosensitive resin film 50, which will be dissolved in subsequent developing processing, except for the area of the parallax barrier layers 41, as shown in FIG. 4A. On the other hand, when the photosensitivity of the photosensitive resin film 50 is negative, the UV light is illuminated to an area of the photosensitive resin film 50 corresponding to the area of the parallax barrier layers 41.

According to performing developing processing after the exposure, the photosensitive resin film 50 is patterned so that the light transmission layers 51 remain on the formation area of the parallax barrier layers 41. A state after the patterning is shown in FIG. 4B.

Regarding a developing solution, any of an organic alkali developing solution and an inorganic alkali developing solution may be used. As the inorganic alkali developing solution, an aqueous solution of sodium carbonate, sodium hydroxide and potassium hydroxide or the like may be appropriately used. As the organic alkali developing solution, an aqueous solution of tetra methyl ammonium hydroxide, an amine-based aqueous solution of methanol amine or the like may be appropriately used. It is preferable to add a surfactant to the developing solution so as to increase uniformity of the developing. Regarding the alkali developing, a dip developing method, a shower developing method, a paddle developing method and the like may be used. After the developing, pure water cleaning is performed so as to remove the alkali developing solution. In the shower developing, it is preferable to adjust a shower pressure so as to form optimal pixels. When the shower pressure is low, a resolution of pixels is lowered. When the shower pressure is high, a pixel may be peeled off from the substrate. The shower pressure is preferably 0.05 to 5 MPa.

The light transmission layers 51 obtained after the developing process are heated. Then, as shown in FIG. 4C, the exposed light shield film 40 is etched and removed using the light transmission layers 51 patterned by the developing as a mask (step S209). Thereby, the laminated structure of the light transmission layers 51 and the parallax barrier layers 41 is formed. When the chromium oxide is used as the light shield film 40, a mixed solution of cerium nitrate and ammonium fluoride solutions may be used as the etching solution.

In the processes of steps S207, S208 and S209 for forming the parallax barrier layers 41, since the substrate seal part 31 is provided at the periphery of the cell substrate 300, as described above, the processing solutions such as developing solution and etching solution are not introduced into the panel. Therefore, since the BM 12 is not etched in the etching for forming the parallax barrier layers 41, it is possible to form the BM and the parallax barrier layers with a common metal film. Also, it is not necessary to form a protection resist for the BM 12. Furthermore, it is possible to suppress the inside of the panel from being contaminated or corroded due to the processing solutions.

Here, when forming the pattern of the parallax barrier layers 41 in step S209, an alignment (positioning) of the pattern of the parallax barrier layers 41 is performed using an alignment mark that is provided to the BM 12 on the surface at a side of the CF substrate 10 at the inner-side face of the cell substrate 300. That is, the photosensitive resin 50 is applied on the light shield film 40 formed in step S207, and the patterning is performed for the applied photosensitive resin 50 by the photolithography method of exposing and developing the photosensitive resin. At this time, the photomask PM is positioned using the alignment mark, and the photosensitive resin 50 is exposed.

The alignment mark is preferably formed at the same time in the process of forming the BM 12 by using the material for forming the BM 12.

In the first illustrative embodiment, since the parallax barrier layers 41 are formed at the state of the cell substrate 300, it is possible to form the parallax barrier layers 41 for a plurality of panels that is bring out from the cell substrate 300. That is, the alignment mark is beforehand provided on a mother board and the parallax barrier layers 41 are simultaneously formed for the panels by using the alignment mark. Accordingly, it is possible to improve the productivity.

In the meantime, regarding the bonding of the CF substrate 10 and the TFT substrate 20 in step S205, the alignment mark provided on the surface of the TFT substrate 20-side at the inner-side face of the cell substrate 300 is used to align the CF substrate 20. The alignment mark is preferably formed at the same time in the process of forming any one layer configuring the TFT substrate 20, such as formation of the gate wirings.

After forming the parallax barrier layers 41 as described above, the cell substrate 300 is cut and is thus divided into a plurality of panels. The liquid crystals 30 are injected into each of the divided panels (step S210). Alternatively, the cell substrate may be divided into a stick shape and then the liquid crystals may be injected into the divided panels. For example, the liquid crystals may be injected through the liquid crystal injection port by a vacuum injection method. In the meantime, when dividing the cell substrate 300, it is preferable to cut out the substrate seal part 31 from the panels. After injecting the liquid crystals 30, the liquid crystal injection port is sealed. For example, a light curing resin is applied to the liquid crystal injection port, and the light is illuminated thereto, so that the resin is cured to seal the liquid crystal injection port.

In the first illustrative embodiment, the liquid crystal injection method using the liquid crystal injection port has been exemplified. However, a dropping injection method may be also used. In the dropping injection method, the panel seal part 32 of a frame shape having no injection port is formed. Then, the liquid crystals 30 are dropped on any one of the TFT substrate 20 and CF substrate 10 having the sealant formed thereon. After dropping the liquid crystals 30, the TFT substrate 20 and the CF substrate 10 are bonded and the sealant is cured. After that, the parallax barrier layers 41 are formed for the cell substrate 30 having the liquid crystals enclosed in the panels and the panels are individually divided (step S210).

Then, the polarization plates 61, 62 are adhered to both outer-side faces of each of the divided liquid crystal display panels 100. Then, the backlight unit 70 and the like are attached, so that the liquid crystal display apparatus is completed (step S211).

The manufacturing process of the liquid crystal display apparatus may use a general process and may be appropriately changed to a well-known method, and the manufacturing process may include at least the formation process of the parallax barrier layers 41 after the formation of the cell substrate 300. Like this, first illustrative embodiment includes that the process of forming the laminated structure of the parallax barrier layers 41 and the light transmission layers 51 is added after the cell substrate 300 is formed.

According to the above feature, the light transmission layers 51 function as the protection layers so that the parallax barriers layers 41 are not peeled off. As a result, it is possible to suppress the brightness point defect. That is, since the parallax barrier layers 41 are formed on the outer-side face of the cell substrate 30, the light transmission layers 51 are sacrificed upon the scratch occurring in step S210 or S211, so that the parallax barrier layers are protected. Furthermore, the manufacturing method itself of the first illustrative embodiment can obtain the effect of reducing the pattern defect. For the understanding thereof, a comparative example will be described.

Comparative Example 1

Figure 5A:
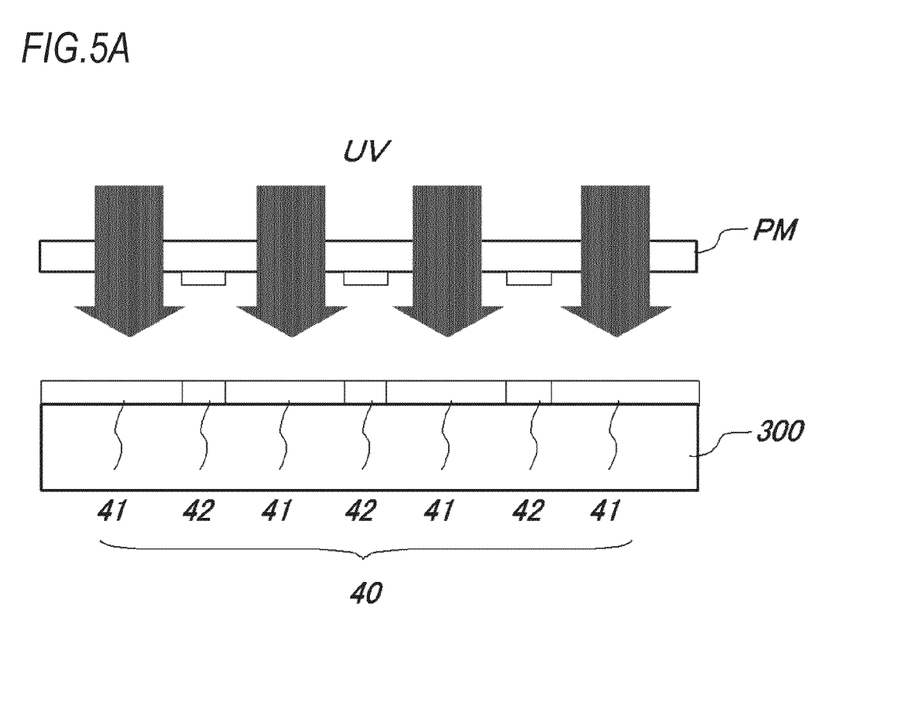
FIGS. 5A and 5B illustrate one manufacturing process of a liquid crystal display apparatus of a comparative example.
Figure 5B:
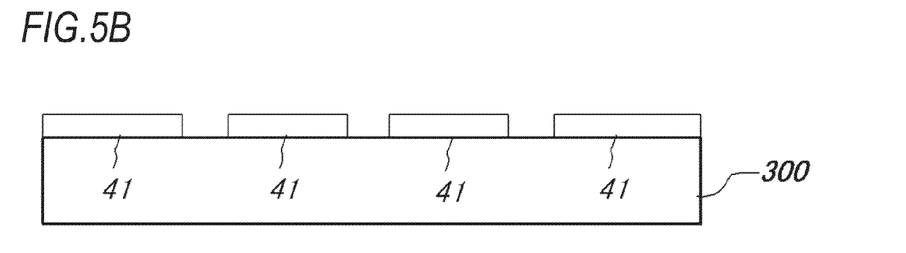

Here, in order to explain the effect of the manufacturing method of the first illustrative embodiment, a manufacturing method will described in which the parallax barrier layers 41 are formed without the light transmission layers 51 that are used in the first illustrative embodiment, i.e., by performing the patterning without forming the light transmission layers 51 after forming the light shield film 40 such as resin BM and the like. FIGS. 5A and 5B illustrate one manufacturing process of a liquid crystal display apparatus according to a comparative example, specifically a sectional view in step S209. The resin BM is photosensitive and a negative type is generally used. Also in the comparative example, the negative type is described. That is, the UV light is illuminated to the area in which the parallax barrier layers 41 are formed. An area 42 to which the UV light is not illuminated is dissolved by the developing solution.

FIG. 5A illustrates a state where there is no unevenness such as glass scratch and foreign materials on the polished surface of the substrate. In this case, since the sufficient UV light is illuminated to the resin BM in an area corresponding to the area that the UV light is enabled to penetrate by the photomask PM, the parallax barrier layers 51 are normally formed in FIG. 5B illustrating a state after the developing process is subsequently performed.

Figure 6A:
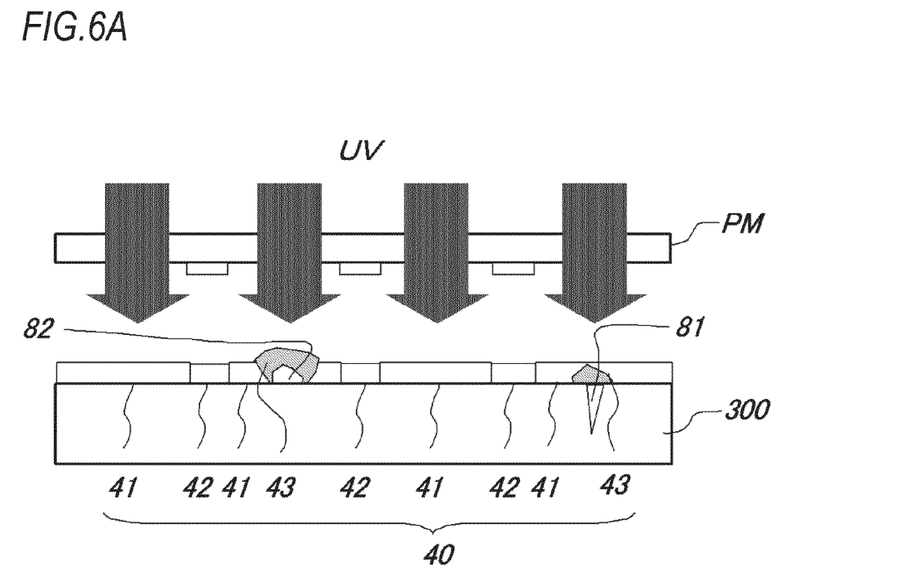
FIGS. 6A and 6B illustrate one manufacturing process of the liquid crystal display apparatus of the comparative example.
Figure 6B:
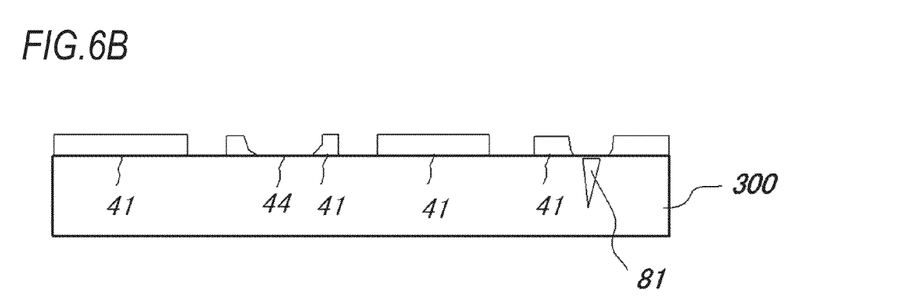
Figure 7:
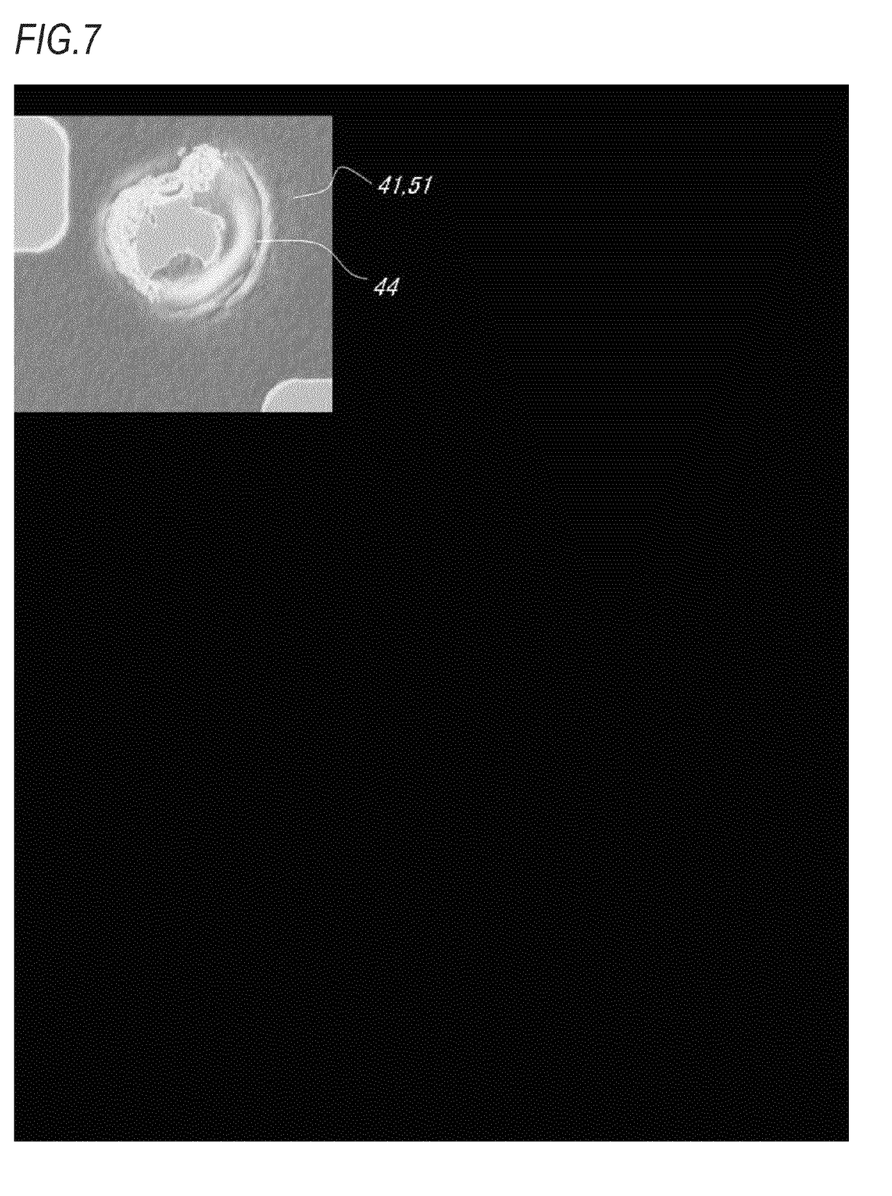
FIG. 7 is a photograph of a pattern defect.

On the other hand, FIGS. 6A and 6B illustrate a state where there is an unevenness such as a glass scratch 81 and a foreign material 82 on the polished surface of the substrate. In this case, since the exposure is out of focus, the sufficient UV light is not illuminated to the resin BM in an area corresponding to the area that the UV light is enabled to penetrate by the photomask PM. That is, a photocrosslinking reaction of the resin BM by the UV light is difficult to occur and there is an area 43 that is dissolved by the subsequent developing process. In FIG. 6B illustrating a state after the developing process is subsequently performed, the resin BM in the area 43 in which the glass scratch 81 or the foreign material 82 exists is removed by the developing, so that a pattern defect 44 is caused in the parallax barrier layer 41. FIG. 7 is a photograph illustrating the pattern defect.

Figure 8A:
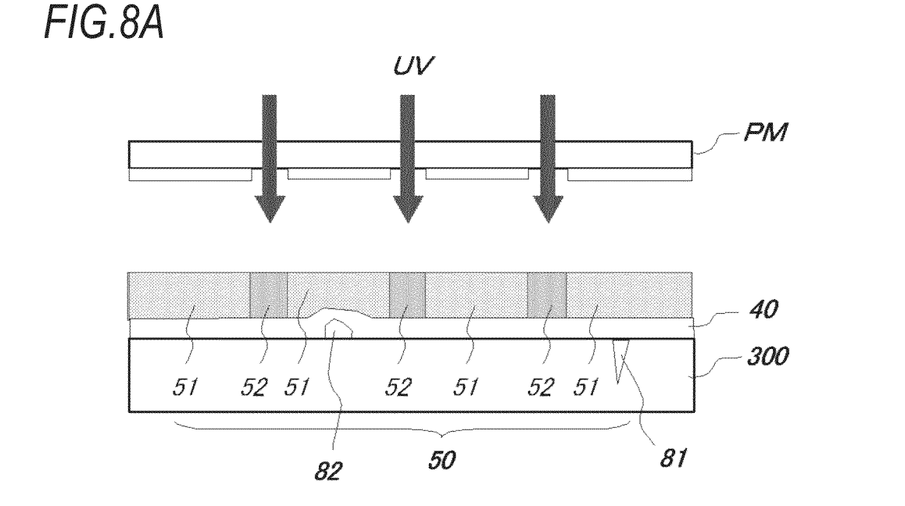
FIGS. 8A, 8B AND 8C illustrate one manufacturing process of the liquid crystal display apparatus of the first illustrative embodiment.
Figure 8B:
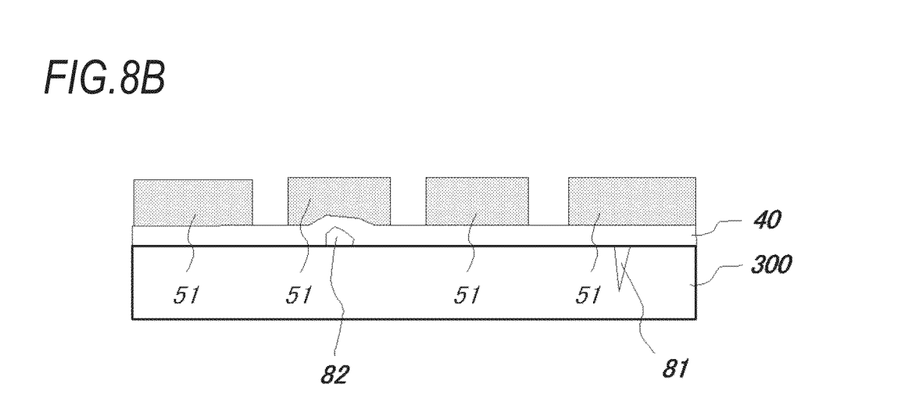
Figure 8C:
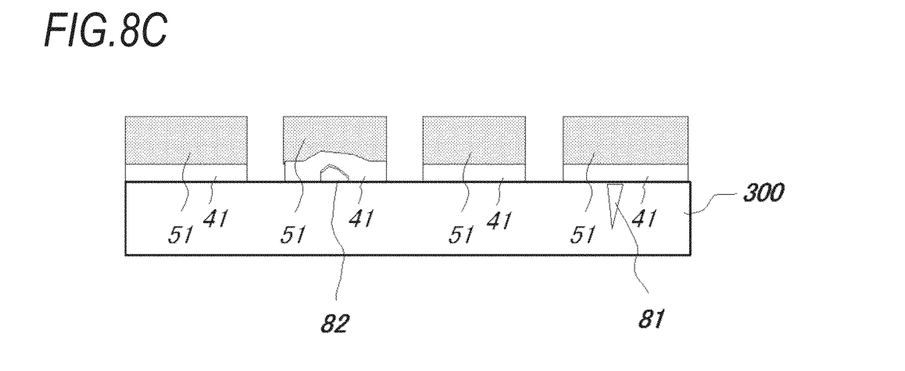

FIGS. 8A, 8B and 8C illustrate that the pattern defects can be suppressed by using the manufacturing method of the first illustrative embodiment even in the state of FIGS. 6A and 6B. FIG. 8A illustrates a case where there is the unevenness such as the glass scratch 81 or the foreign material 82 on the polished surface of the substrate in step S209, similarly FIGS. 6A and 6B. However, the case is different from that of FIG. 6A, in that the laminated structure of the parallax barrier layers 41 and the light transmission layers 51 is formed, which used in the first illustrative embodiment.

In FIG. 8A, there is the unevenness such as glass scratch 81 or foreign material 82 on the polished surface of the substrate. However, the transparent photosensitive resin film 50 forming the light transmission layers 51 enables a sufficient amount of the light necessary for a desired area to be illuminated over an entire depth of the photosensitive resin film 50. Therefore, even after the developing, the pattern defect as shown in FIG. 6B does not occur, and thus it is possible to form the light transmission layers 51 having no pattern defect, as shown in FIG. 8B. That is, since the resin BM under the light transmission layers 51 is not directly exposed to the developing solution, it is not developed. Therefore, it is possible to form the parallax barrier layers 41 having no pattern defect by using the light transmission layers 51 as an etching mask to thereby etch the exposed resin BM, as shown in FIG. 8C.

Also, when the substrate surface, which is a base surface, has a scratch upon the exposure of the transparent photosensitive resin film 50, the UV light is absorbed in the resin BM film because the resin BM is formed on the substrate at the state shown in FIG. 8A. That is, the manufacturing method of the first illustrative embodiment has a merit that it is not affected by reflected light from the base surface such as substrate surface upon the exposure.

Second Illustrative Embodiment

In the first illustrative embodiment, the light transmission layers are stacked on the parallax barrier layers. When applying the light transmission layers to the parallax barrier layers, it is necessary to consider the shape thereof. Although the structure or manufacturing method of the second illustrative embodiment is based on the first illustrative embodiment, the second illustrative embodiment has a feature related to the shape of the light transmission layer or manufacturing method thereof.

In the liquid crystal display apparatus of the first illustrative embodiment, when the light transmission layers 51 are arranged on the outermost side of the structure, the transparency of the light transmission layers 51 may be deteriorated as they are exposed to the UV light such as sunlight for a long time. Here, when the light, which is illuminated from the backlight unit 70 and passes through the openings of the parallax barrier layers 41 to contribute to the display, passes through the light transmission layers 51 whose transparency is lowered, the brightness is lowered or a color is changed.

Figure 9A:
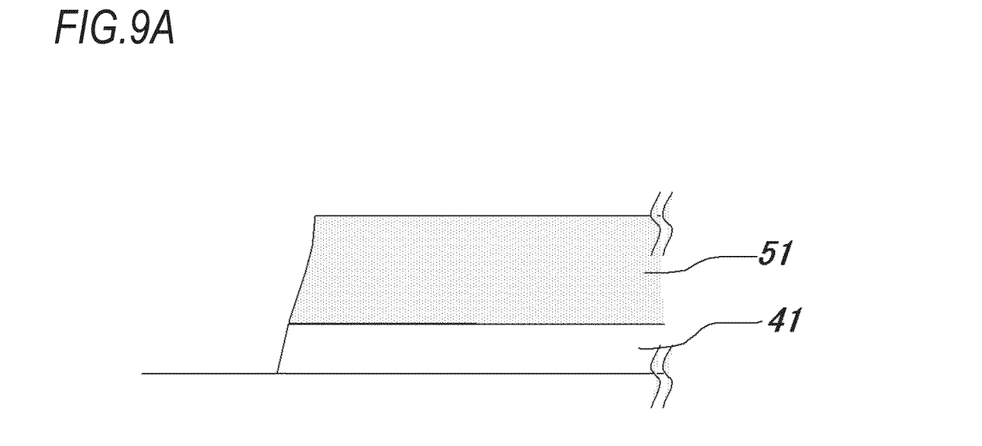
FIGS. 9A and 9B illustrate a parallax barrier of a liquid crystal display apparatus of a second illustrative embodiment.
Figure 9B:
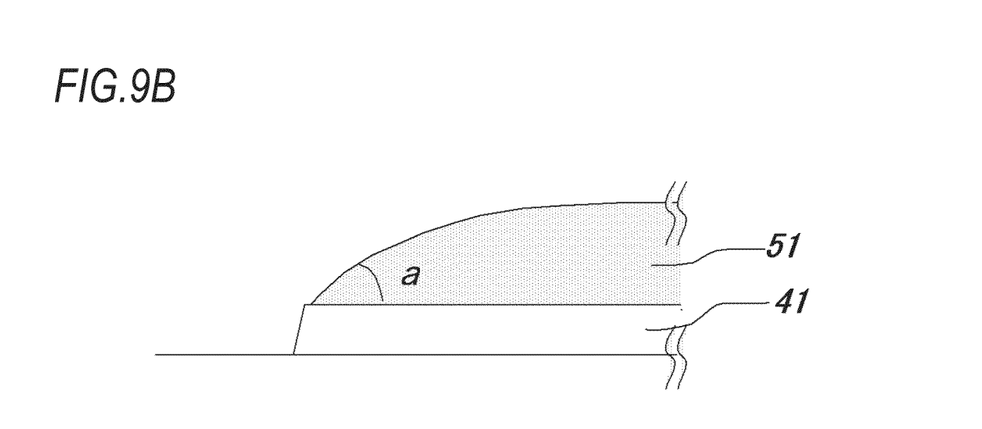

FIGS. 9A and 9B are sectional views of a parallax barrier layer of a liquid crystal display apparatus of the second illustrative embodiment. In the second illustrative embodiment, a sidewall angle a of a sectional shape of a pattern edge part of the light transmission layer 51 is 40 degrees or smaller, preferably 30 degrees or smaller. According to this structure, even when the light contributing to the display obliquely passes through the opening of the parallax barrier layer 41, it is not blocked by the light transmission layer 51. Thereby, it is possible to suppress the lowering of the brightness or change of the color.

In the meantime, it is preferable to set the sidewall angle a of the sectional shape of the light transmission layer 51 to be 20 degrees or larger. When the sidewall angle is smaller than 20 degrees, the edge part has a sharp protruding shape, so that the resin part may be cracked or the adhesion state thereof may be deteriorated and thus it causes the pattern defect.

In the manufacturing method of the liquid crystal display apparatus of the second illustrative embodiment, after forming the laminated structure of the light transmission layers 51 and the parallax barrier layers 41 in step S209 of the manufacturing process of the first illustrative embodiment, it is subject to heating processing at temperatures of the upper limit temperature (heatproof temperature) or higher capable of maintaining the shape of the photosensitive resin film 50 forming the light transmission layers 51. According to heat reflow of the light transmission layers 51, which is accompanied by the heating processing, the sectional shape of the patterned edge part of the light transmission layer 51 can be formed into a shape as shown in FIG. 9B.

What is claimed is:

1. A display apparatus, comprising:
   a first substrate;
   a second substrate that is arranged to face the first substrate and is thinner than the first substrate;
   a sealant that bonds the first substrate and the second substrate;
   a display material that is provided between the first substrate and the second substrate; and
   a parallax barrier layer and a light transmission layer stacked on the parallax barrier layer that are provided on a surface of the second substrate opposite to the first substrate,
   wherein a sidewall angle of a sectional shape of the light transmission layer is 20 degrees to 40 degrees.

2. The display apparatus according to claim 1,
   wherein the sidewall angle of the sectional shape of the light transmission layer is 20 degrees to 30 degrees.

* * * * *